WILLIAM E. HUGHES.
Improvement in Pruning Shears.

No. 115,735. Patented June 6, 1871.

Witnesses:
J. S. Hallowell,
John E. Richards.

Inventor:
William E. Hughes.

UNITED STATES PATENT OFFICE.

WILLIAM E. HUGHES, OF AYLMER, CANADA.

IMPROVEMENT IN PRUNING-SHEARS.

Specification forming part of Letters Patent No. 115,735, dated June 6, 1871.

I, WILLIAM E. HUGHES, of Aylmer, in the county of Elgin and Province of Ontario, Canada, have invented certain Improvements in Pruning-Machines, of which the following is a specification:

My machine is for the purpose of pruning the smaller limbs from fruit and other trees; the object being to render getting into the tree unnecessary, and also the saving the trees from injury by using a ladder, or from being bruised by the weight of a person in the tree, and that a tree can be pruned more symmetrically from the ground.

Figure 1:
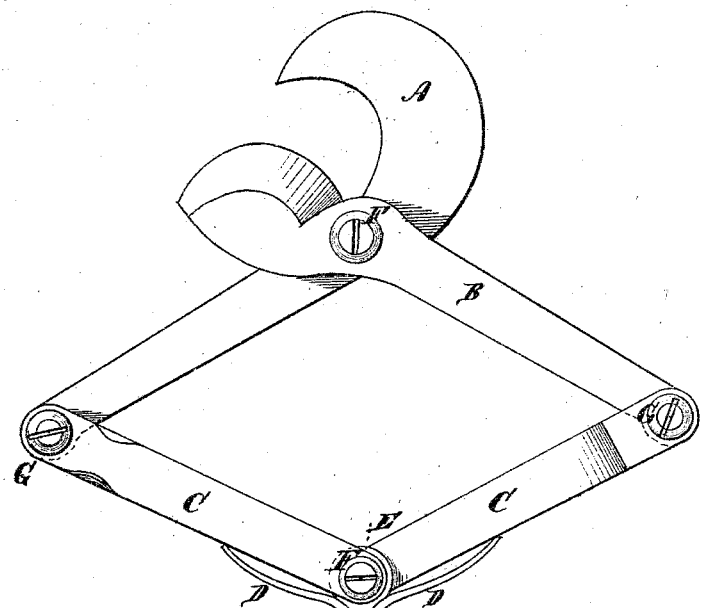

Figure 1 shows the machine complete.

A, an upper-cut knife; B, an under-cut knife; C C, arms connecting the knives to the flat-headed screw E; D D, steadying-arms, keeping the machine in place when open; F F, joints, (bolt and nut;) G G, joints, (riveted;) H, iron ferrule, preventing pole from splitting; I, pole.

Figure 2:
Figure 2:
Figure 3:
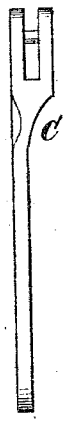

Fig. 2, screw removed from pole; Fig. 3, sectional view of arms C C.

The machine being opened, as seen in the drawing, the knife A is hooked to the limb desired to be removed; the pole is then jerked sharply, which causes the edges of the knives A and B to meet or pass each other, thus making a clean cut, without injury to the bark below the cut.

The joints F F are made with a bolt and nut to allow the machine to be easily taken apart for the purpose of sharpening.

I claim as my invention—

The combination and arrangement of the knives A and B, together with the arms C C and the steadying-arms D D, substantially as and for the purpose hereinbefore set forth.

WILLIAM E. HUGHES.

Witnesses:
JAMES S. HALLOWELL,
JOHN E. RICHARDS.